(12) United States Patent
Weinstein et al.

(10) Patent No.: US 6,898,033 B2
(45) Date of Patent: May 24, 2005

(54) ANTICIPATING MEDIA DECAY IN A DISC DRIVE

(75) Inventors: Robert Edward Weinstein, Louisville, CO (US); Elias Glavinas, Superior, CO (US); Timothy Ray Mason, Longmont, CO (US); Randall Lee Pacek, Niwot, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 188 days.

(21) Appl. No.: 10/028,003

(22) Filed: Dec. 20, 2001

(65) Prior Publication Data

US 2003/0067697 A1 Apr. 10, 2003

Related U.S. Application Data

(60) Provisional application No. 60/327,265, filed on Oct. 5, 2001.

(51) Int. Cl.[7] .............................. G11B 27/36; G11B 5/09
(52) U.S. Cl. ............................................ 360/31; 360/53
(58) Field of Search .............................. 360/31, 53, 46, 360/66; 369/47.1; 714/746

(56) References Cited

U.S. PATENT DOCUMENTS

| | | | |
|---|---|---|---|
| 4,873,680 A | | 10/1989 | Chung et al. ................. 369/59 |
| 5,475,666 A | | 12/1995 | Ito et al. ......................... 369/54 |
| 5,490,091 A | * | 2/1996 | Kogan et al. .................. 360/53 |
| 5,600,500 A | * | 2/1997 | Madsen et al. ............... 360/53 |
| 5,625,506 A | * | 4/1997 | Dovek et al. ................. 360/53 |
| 6,084,729 A | | 7/2000 | Ito ............................... 360/31 |
| 6,157,507 A | * | 12/2000 | Korenari et al. .............. 360/53 |
| 6,191,905 B1 | * | 2/2001 | Takeuchi ...................... 360/53 |
| 6,603,617 B1 | * | 8/2003 | Cross .......................... 360/31 |

* cited by examiner

*Primary Examiner*—David Hudspeth
*Assistant Examiner*—Glenda P. Rodriguez
(74) *Attorney, Agent, or Firm*—Fish & Richardson P.C., P.A.

(57) ABSTRACT

A procedure for estimating bit error rate (BER) for disc media in a disc drive is disclosed. Initially, the BER estimation procedure writes random data to specified tracks on the disc media. The procedure then reads the specified tracks over predefined time intervals to determine a BER for the disc media at the termination of each interval. Using the determined bit error rates, the procedure extrapolates the BER values to generate a decay graph representative of a BER slope over the time period comprising the time intervals. The decay graph is then used to estimate BER for the disc media at a predetermined time, such as the end of the expected life of the disc drive.

32 Claims, 8 Drawing Sheets

ANTICIPATING MEDIA DECAY IN A DISC DRIVE

RELATED APPLICATIONS

This application claims priority of U.S. provisional application Ser. No. 60/327,265, filed Oct. 5, 2001.

FIELD OF THE INVENTION

This application relates generally to a certification test for a disc drive and more particularly to a test for estimating bit error rate for disc media in the disc drive.

BACKGROUND OF THE INVENTION

In a disc drive, data is stored on one or more discs coated with a magnetizable medium. Data is written to the discs by an array of transducers, typically referred to as read/write heads, mounted to a radial actuator for movement of the heads relative to the discs. The data is stored on a plurality of concentric circular tracks on the discs until such time that the data is read from the discs by the read/write heads. Each of the concentric tracks is generally divided into a plurality of separately addressable data sectors. The heads are used to transfer data between a desired track and an external environment, which includes, among many components, a host computer. During a read operation the head senses the data previously written on the disc track and transfers the information to the external environment. During a write operation, data is written onto the disc track. Once data is written to the disc, each sector holds a block of data, which is the absolute smallest quantity that can be written to the disc during a single write operation. Over the lifetime of a disc drive, data may be stored on a disc media for periods of time ranging from microseconds to any number of years.

With respect to data stored on disc media for relatively large periods of time, thermal decay of the disc media may eventually result in data loss of an undesirable magnitude. Thermal decay is a progressive loss of amplitude of recorded data on disc media. Thermal decay causes a loss of playback signal-to-noise ratio (SNR), which in turn causes degraded bit error rate (BER) of the recovered data. BER is defined as a ratio of error bits to total bits. As track widths have decreased, media grain sizes have been made smaller to boost SNR. Such a progressive decrease in media grain size typically results in higher levels of thermal decay on the disc media. Over an expected lifetime of five years, thermal decay typically causes a BER degradation of two orders of magnitude. That is, if a drive starts with a BER of one error in $10^8$ bits read, which is conventionally denoted as BER= $10^{-8}$, in five years the BER would most likely be one error for every $10^6$ bits read, e.g., BER=$10^{-6}$. Error rates below $10^{-6}$ have been shown to cause unrecoverable errors and drastically slow drive performance. Because future disc drives are expected to have even smaller grain sizes, present trends associated with increasing thermal decay are expected to continue.

Additionally, current difficulties in controlling distribution of grain sizes on disc media result in inconsistent levels of thermal decay on different disc surfaces, even within the same disc drive. Thermal decay of each particular disc may also be undesirably increased by SNR associated with a recording head playback element and a write field gradient of the write element, both of which can vary from head to head. As such, individual heads in a disc drive may also affect thermal decay variances between discs. Techniques do not currently exist at the media component level to economically and rapidly test each disc surface for BER degradation due to thermal and amplitude decay because a relatively significant amount of time is needed to reliably observe thermal decay in conventional disc drive products. Furthermore, thermal decay is typically greater at the high temperatures found in disc drives, such as temperatures realized during the operational state of the drive, and not the lower temperatures encountered during product development or functional testing processes.

SUMMARY OF THE INVENTION

Against this backdrop the present invention has been developed. The present invention is a procedure for estimating bit error rate for disc media in a disc drive in accordance with an embodiment of the present invention. More particularly, the bit error rate estimation procedure is a process performed during the drive's certification test that estimates bit error rate for disc media at a predetermined time. Initially, the procedure writes random data to one or more test tracks on a system area of the disc media. Next, the procedure accesses the test tracks to read the recorded data and thereafter determine a raw error value for each test track on which read errors are encountered as the tracks are read at specified points of time during the certification test. The specified points of time may be referred to as interval points. The interval points serve as beginning and ending points of time for a plurality of time intervals that together form a predetermined time period beginning once random data is written to the test tracks and ending at the predetermined time.

After performing a predefined number of read operations, the procedure computes bit error rate for the media at each specified interval point by applying statistical analysis to the measured raw error values of each test track. The procedure then utilizes the computed bit error rate at each interval point to estimate a bit error rate for the disc media at the predetermined time. In accordance with an embodiment, the predetermined time corresponds to the end of the expected life of the disc drive. Finally, the estimated bit error rate at the predetermined time is compared to a threshold bit error rate associated with the predetermined time. In situations where the predetermined time correlates to the end of the expected life of the disc drive, the threshold bit error rate may be defined as a rate that would render the disc media inoperable to effectively store data at the end of the expected life. As such, the bit error rate estimation process may function as a test to determine the operability of the disc drive to store data over the lifetime of the drive.

In accordance with an alternative embodiment, the procedure may write random data to one or more reference tracks on the system area of the disc media at each interval point occurring during the certification test. Immediately following reference track write operations, i.e., following one revolution of the disc, and at the same interval points, the procedure accesses each reference track to read the recorded data and thereafter determine a raw error value for each reference track on which read errors are encountered as the tracks are read at the interval point. After repeating this write and subsequent read sequence for a predefined number of instances, the procedure computes bit error rate for the disc media due to non-decay phenomena at each specified interval point by applying statistical analysis to the measured raw error values of each reference track. The procedure then normalizes the bit error rates computed for the test tracks at each interval point by the computed bit error rate due to non-decay phenomena to more accurately estimate the decay-based bit error rate for the disc media at the predetermined time.

The present invention can be implemented as a computer-readable program storage device which tangibly embodies a program of instructions executable by a computer system to estimate bit error rate for a disc media at a predetermined time.

These and various other features as well as advantages which characterize the present invention will be apparent from a reading of the following detailed description and a review of the associated drawings.

DETAILED DESCRIPTION

Figure 1:
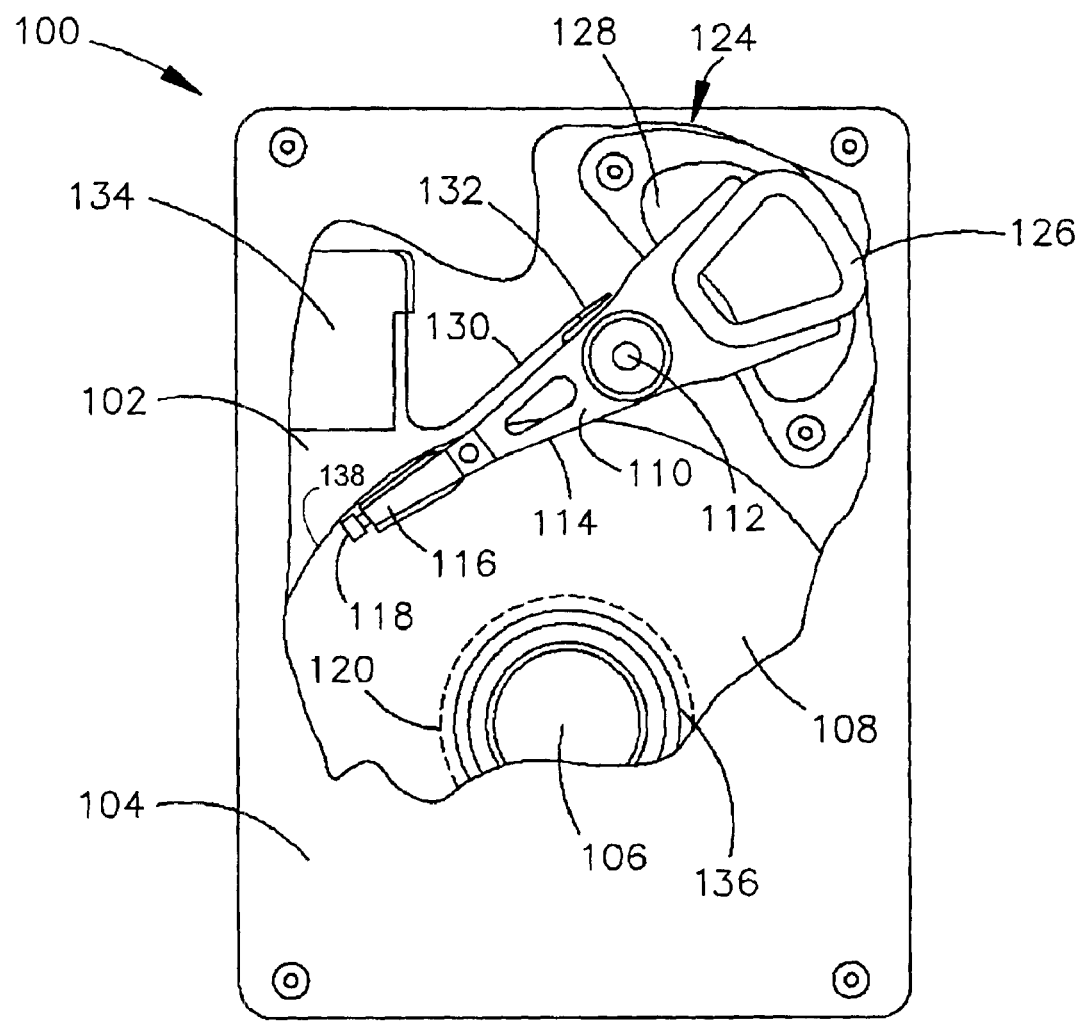
FIG. 1 is a plan view of a disc drive incorporating a preferred embodiment of the present invention showing the primary internal components.

Illustrative various embodiments of the present invention are described in detail below with reference to the figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more discs 108 at a constant high speed. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend toward the discs 108, with one or more flexures 116 extending from each of the actuator arms 114. Mounted at the distal end of each of the flexures 116 is a read/write head 118 which includes an air bearing slider enabling the read/write head 118 to fly in close proximity above the corresponding surface of the associated disc 108.

The spindle motor 106 is typically de-energized when the disc drive 100 is not in use for extended periods of time. In accordance with a first embodiment of the present invention, the read/write heads 118 may be moved over park, or landing, zones 120 near the inner diameter 136 of the discs 108 when the drive motor is de-energized. The read/write heads 118 may be secured over the landing zones 120 through the use of an actuator latch arrangement, which prevents inadvertent rotation of the actuator assembly 110 when the heads 118 are parked. Although the landing zone 120 is shown in FIG. 1 as located in close proximity to the inner diameter 136 of the discs 108, a landing zone 120 may also be located in close proximity to an outer diameter 138 of the discs 108. Furthermore, a landing zone 120 may be located on any portion of the discs 108 between the outer diameter 138 and the inner diameter 136 of the discs 108. In accordance with a second embodiment of the present invention, the read/write heads 118 may be removed from the surface of the discs 108 by load/unload ramps (not shown) positioned in close proximity to the outer diameter 138 when the drive motor is de-energized. As such, the read/write heads 118 may be secured by the ramps to prevent inadvertent rotation of the actuator assembly 110 when the discs 108 are spinning at a velocity insufficient to maintain an air bearing between the sliders and the discs 108. The heads 118 are maintained on the ramps in the park position through the use of an actuator latch arrangement, which prevents inadvertent rotation of the actuator arms 114 when the heads are parked. This latch arrangement is typically a magnetic latch which magnetically holds the actuator against a stop.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
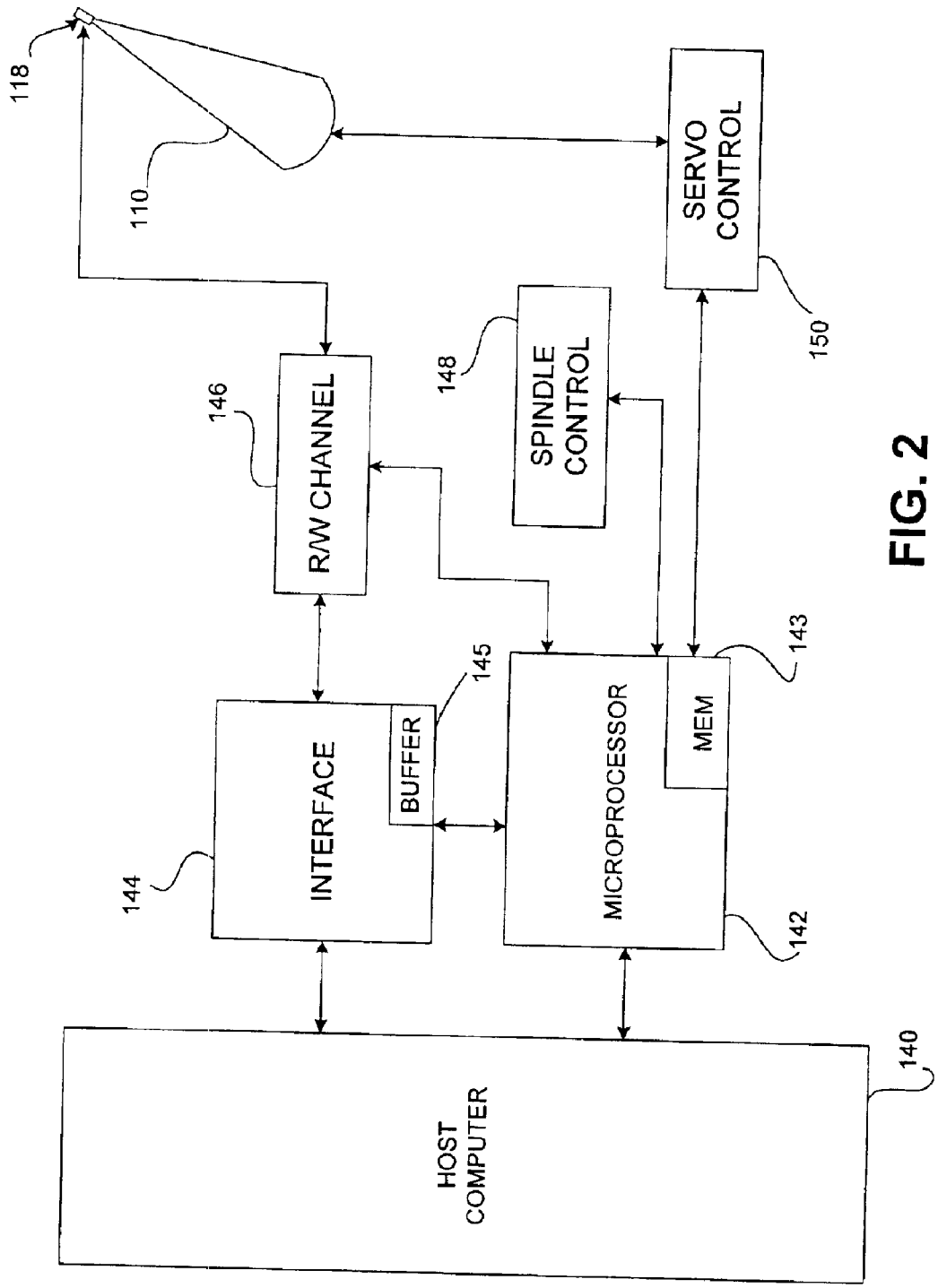
FIG. 2 is a functional block diagram generally showing the main functional components used to control the disc drive of FIG. 1.

Referring now to FIG. 2, shown therein is a functional block diagram of the disc drive 100 of FIG. 1 generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM), and other sources of resident memory for the microprocessor 142. The discs 108 are rotated at a constant high speed by a spindle control circuit 148. The radial position of the heads 118 is controlled through the application of current to a coil in the actuator assembly 110. A servo control system 150 provides such control.

Data is transferred between the host computer 140 and the disc drive 100 by way of a disc drive interface 144, which includes a buffer 145 to facilitate high speed data transfer between the host computer 140 and the disc drive 100. Data to be written to the disc drive 100 is thus passed from the host computer 140 to the buffer 145 and then to a read/write channel 146, which encodes and serializes the data and provides the requisite write current signals to the heads 118. To retrieve data that has been previously stored by the disc drive 100, read signals are generated by the heads 118 and provided to the read/write channel 146. The interface 144 performs read signal decoding, error detection, and error correction operations. The interface 144 then outputs the retrieved data to the buffer 145 for subsequent transfer to the host computer 140. Such operations of the disc drive 100 are well known in the art and are discussed, for example, in U.S. Pat. No. 5,276,662 issued Jan. 4, 1994, to Shaver et al.

Figure 3:
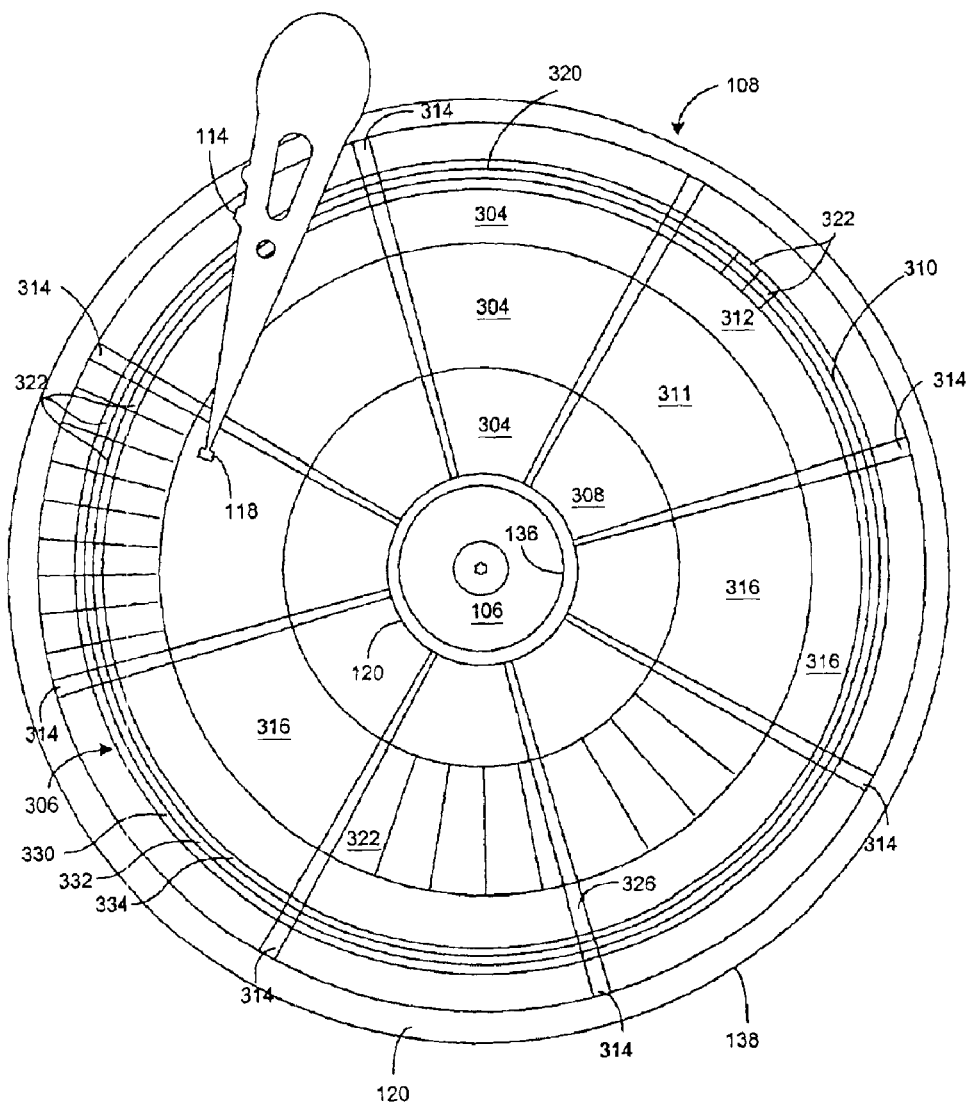
FIG. 3 is a plan view of the disc of FIG. 1 generally showing the main components on the surface of the disc.

FIG. 3 shows a logical recording structure for a recordable medium of an exemplary disc 108 of the disc drive 100. The disc 108 is divided into several concentric disc zones 304 which contain regions of adjacent tracks 306. For example, the magnetic disc 108 of FIG. 3 includes an inner zone 308, a center zone 311, and an outer zone 312. When configured with servo burst sectors 314, each disc track 306 is divided into slices called data wedges 316. The burst sectors 314 include servo data for maintaining accurate positioning of the read/write head 118 and are positioned in predetermined locations around the disc 108. As the disc 108 rotates, the read/write head 118 reads the servo information, such as track address information, within a servo burst 314 and sends the servo information back to the servo control system 150. The servo control system 150 checks whether the address in the servo information read from the burst sector 314 corresponds to the desired head location. If the address does not correspond to the desired head location, the actuator arm 114 is adjusted until the head 118 is moved to the correct track location.

Each track 306 includes discrete data sectors 322 containing stored user information. The number of data sectors 322 defined on a particular track 306 depends, in part, on the length (i.e. circumference) of the track 306. Therefore, tracks 306 located at the outer zone 312 typically contain more data sectors 322 per data wedge 316 than tracks 306 located at the center zone 311. Similarly, tracks 306 located at the center zone 311 typically contain more data sectors 322 per data wedge 316 than tracks 306 located at the inner zone 308. Besides containing user information, each data sector 322 may also include other data to help identify and process the user information. Tracks 306 may also contain one or more permanently defective sectors 322 that cannot be reliably written to or read from by the disc drive 100 circuitry. For this reason, a number of alternate sectors are provided in one or more alternate tracks 320 to which data that is intended to be written in these defective sectors can be revectored.

Over time, thermal decay, which is a progressive loss in amplitude of data on the disc 108, may cause an increase in bit error rate (BER) of data recorded on the disc 108. A BER estimation process in accordance with an embodiment of the present invention, such as the estimation process 400 shown and described in more detail with FIG. 4, may be used during disc drive development to estimate BER for each disc surface of an assembled disc drive 100 over a predetermined time period. In accordance with this embodiment of the present invention, the predetermined time period may be an expected life of the disc drive 100. The BER estimation process 400 may use any number of tracks 306 to measure and thereafter estimate BER for a disc surface over the predetermined time period. A specified number of tracks 306 are preferably reserved on the disc surface for measuring BER during the estimation process 400. Specifically, these tracks 306 may be located on a protected area of the disc surface referred to as the system area. The system area is typically pre-scanned for defects. As such, tracks 306 on the system area may also be used for other testing and certification purposes by the drive 100.

The system area may be further divided into one or more test tracks 330, one or more guard tracks 332 and/or one or more reference tracks 334. In accordance with a preferred embodiment, the BER estimation process 400 may utilize test tracks 330, but not reference tracks 334. Alternatively, the BER estimation process 400 may utilize test tracks 330 as well as reference tracks 334. Regardless of the embodiment, guard tracks 332 preferably separate each test track 330 from other test tracks 330 and reference tracks 334 in order to prevent an off-track write from corrupting data recorded on either the test (330) or reference (334) tracks.

As described in more detail below, the BER estimation process 400 is preferably administered during a functional test of the disc drive 100, which typically occurs after the disc drive 100 is fully assembled. More specifically, the BER estimation process 400 is preferably performed during a drive certification test. The BER estimation process 400 records random data to the test tracks 330 at the initialization of the process 400 and thereafter reads the test tracks 330 at one or more interval points throughout the BER estimation process 400. The process 400 computes BER for the test tracks 330 at each interval point and records this information in a log file. By recording BER information in a log file, BER for the disc surface corresponding to relative points in time may be determined over the predetermined time period. As described below, BER for a disc surface over the predetermined period of time, e.g., over the anticipated life of the drive 100, may be estimated based on conventional regression and extrapolation.

The disc 108 may also include reference tracks 334 which, like the test tracks 330, are written with random data once early in the BER estimation process 400. However, unlike the test tracks 330, the reference tracks 334 are both written and read at each predefined interval point during the procedure thereby providing a measure of BER predominantly affected by non-decay phenomenon. As noted above, if reference tracks 334 are included on the disc 108 and used by the BER estimation process 400, guard tracks 332 may be situated between each test track 330, and each reference track 334 to prevent an off-track write from corrupting data recorded on either the test (330) or reference (334) tracks. The guard tracks 332 are preferably erased at the beginning of each BER estimation process 400. Operations for estimating BER for a disc surface over an anticipated life of a disc drive 100 using the BER estimation process 400 are further described with reference to the flow diagrams, extrapolation plots and timing diagrams described below.

In accordance with an embodiment, the present invention may be implemented as a computer-readable program storage device which tangibly embodies a program of instructions executable by a computer system to measure raw error values for tracks 306 of a disc surface over specified time intervals and estimate therefrom BER for the disc surface at any given time during the expected life of the disc 108. As such, the logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
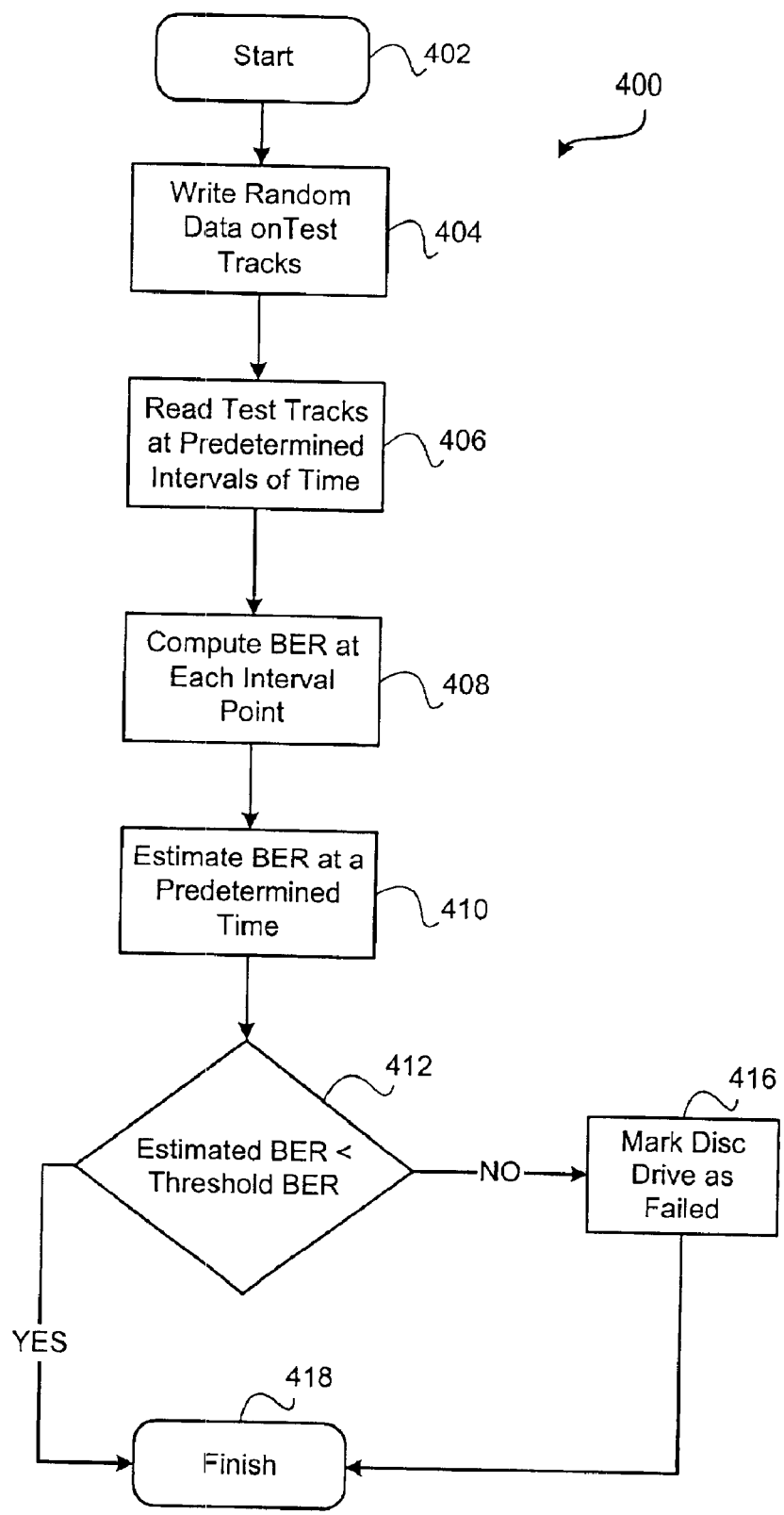
FIG. 4 is a flow diagram that illustrates operational characteristics for estimating bit error rate for disc media at a predetermined time in accordance with an embodiment of the present invention.

FIG. 4 illustrates operations associated with estimating BER of a data storage disc surface over time intervals while the disc drive 100 housing the disc 108 undergoes a certification test. Specifically, the flow diagram shown in FIG. 4 illustrates operations of a BER estimation process 400 in accordance with an embodiment of the present invention. As noted above, the BER estimation process 400 may only be a part of the certification test for the disc drive 100. Other processes that may take place during the certification test are well known in the prior art and therefore not described in detail. The certification test is typically a process performed during functional testing of the disc drive 100 following disc drive assembly. During functional testing, the disc drive 100 is powered up using electronics internal to the drive 100 and run through a series of tests. These tests may include verifying servo information written on the disc 108, setting and checking alignment of heads 118 on the disc surfaces, scanning the disc media for defects and certifying the disc drive 100 using the aforementioned certification test. It should be appreciated that such a functional test for a disc drive 100 may include various other processes/tests that perform some type of operation or testing on an assembled disc drive 100 prior to packaging and subsequent delivery of the drive 100 to a customer. Although the BER estimation process 400 is described below as estimating BER for a single disc surface at the predetermined time (e.g., end of anticipated life), the process 400 may be sequentially or simultaneously performed to estimate BER for all disc surfaces in a disc drive 100 as the drive 100 undergoes a certification test.

With this overall environment in mind, the BER estimation process 400 comprises an operation flow beginning with a start operation 402 and concluding with a termination operation 418. Specifically, the BER estimation process 400 is initiated at the start operation 402 as the certification test begins. From the start operation 402, operation flow passes to a write operation 404. The write operation 404 writes random data on test tracks 330 located on the system area of the disc surface. The system area may contain as many test tracks 330 as needed to perform the BER estimation process 400. However, in an exemplary embodiment of the present invention, the system area includes, and thus the write operation 404 writes random data to, three (3) test tracks 330 located on the system area of the disc surface. The system area of the disc surface may be located on any area of the disc 108, but preferably is located at the outer diameter (OD) 138. The write operation 404 may be referred to as a decay test initialization operation that writes each test track 330 three times with the randomizer (not shown) and encoder (not shown) "off." Writing to a track 306, such as a test track 330, while the randomizer and encoder are both "off" may be referred to as a DC erase. Following DC erase, the write operation 404 writes each test track 330 once with zeros while the randomizer and encoder are both "on." Following the write operation 404, operation flow passes to a read operation 406.

The read operation 406 administers operations for reading data recorded on the test tracks 330. Specifically, the read operation 406 reads each test track 330 multiple times over a predetermined period of time to measure a raw error value for each test track 330. The period of time is divided up into predetermined time intervals wherein each interval of time begins and ends at an interval point. At each interval point, the read operation 406 reads a predetermined number ($X^N$) of data bits on each test track 330. In fact, the read operation 406 reads each test track 330 in triplet, thereby resulting in $3*X^N$ data bits being read on each track 330 at each interval point, in accordance with a preferred embodiment. By reading data from each test track 330 three times, the read operation 406 may accurately track the number of read errors that occur as each track is accessed. Reading each test track 330 in triplet is only one embodiment and it should be appreciated that the read operation 406 may read each test track 330 any number of multiple times, including once. The read operation 406 records the number of errors, i.e., the raw error value, for each test track 330. As noted above, these interval points at which data is read are referenced from the start operation 402. From the read operation 406, operation flow passes to a compute operation 408.

The compute operation 408 computes BER for the disc 108 as measured at each interval point during which the read operation 406 read random data stored on the disc 108. Specifically, the compute operation 408 adds raw error values for all test tracks 330 together and divides the resulting sum by the total number of bits read on the disc surface. Thus, in accordance with an exemplary embodiment, the compute operation 408 divides the total number of errors by $3*X^N$, where, as noted above, $X^N$ is defined as the total number of bits read for each test track 300, whether read singularly, in triplet, or any other number of times, and (3) is the number of test tracks 330 read by the read operation 406. After BER for the disc surface at each interval point is computed by the compute operation 408, operation flow passes to an estimate operation 410. The estimate operation 410 uses the computed BER of the disc 108 at each interval point to estimate BER for the disc surface out to the predetermined time. Both estimate operation 410 and the compute operation 408 are described in more detail below with reference to FIGS. 5, 6, 7 and 8. In accordance with an embodiment of the present invention, the estimate operation 410 may use a regression and extrapolation process to determine an estimated BER at the predetermined time. The predetermined time is preferably equivalent to the end of the anticipated life of the disc drive 100. Once BER for the disc surface at the end of the predetermined time is estimated, operation flow preferably passes to a query operation 412.

The query operation 412 is basically a "go/no go" test that compares the estimated BER to a threshold BER. The threshold BER is a BER value determined by the disc drive developer to be an unsatisfactory BER for the disc surface if measured at the predetermined time. As such, by setting the predetermined time as the end of the anticipated life of the drive 100, a developer may estimate if the drive 100 will still be operable to satisfactorily store data for as long as the drive 100 is reasonably expected to be in operation. Thus, the threshold BER may be a value that corresponds to the absolute highest, or insufficient, BER that may occur at the end of the anticipated life of the disc drive 100. If the query operation 412 determines that the estimated BER is less than the threshold BER, operation flow concludes with terminate operation 418 and the disc drive 100 continues with various other development processes/tests or preparation for shipment to a customer.

If, however, the query operation 412 determines that the estimated BER is greater than the threshold BER, operation flow passes to a mark failure operation 416. The mark failure operation 416 marks the disc drive 100 as having at least one disc surface that will not have a satisfactory BER at the predetermined time. As such, that disc drive 100 contains a disc surface having a decay rate that will render the surface inoperable to store data at the predetermined time. The predetermined time may be defined as the end of the anticipated life of the disc drive 100 in accordance with an exemplary embodiment of the present invention. A disc drive 100 marked as failed by the mark operation 416 may be pulled from development and thereafter refused shipment to a customer. Following the mark failure operation 416, operation flow concludes with the terminate operation 418.

Figure 5:
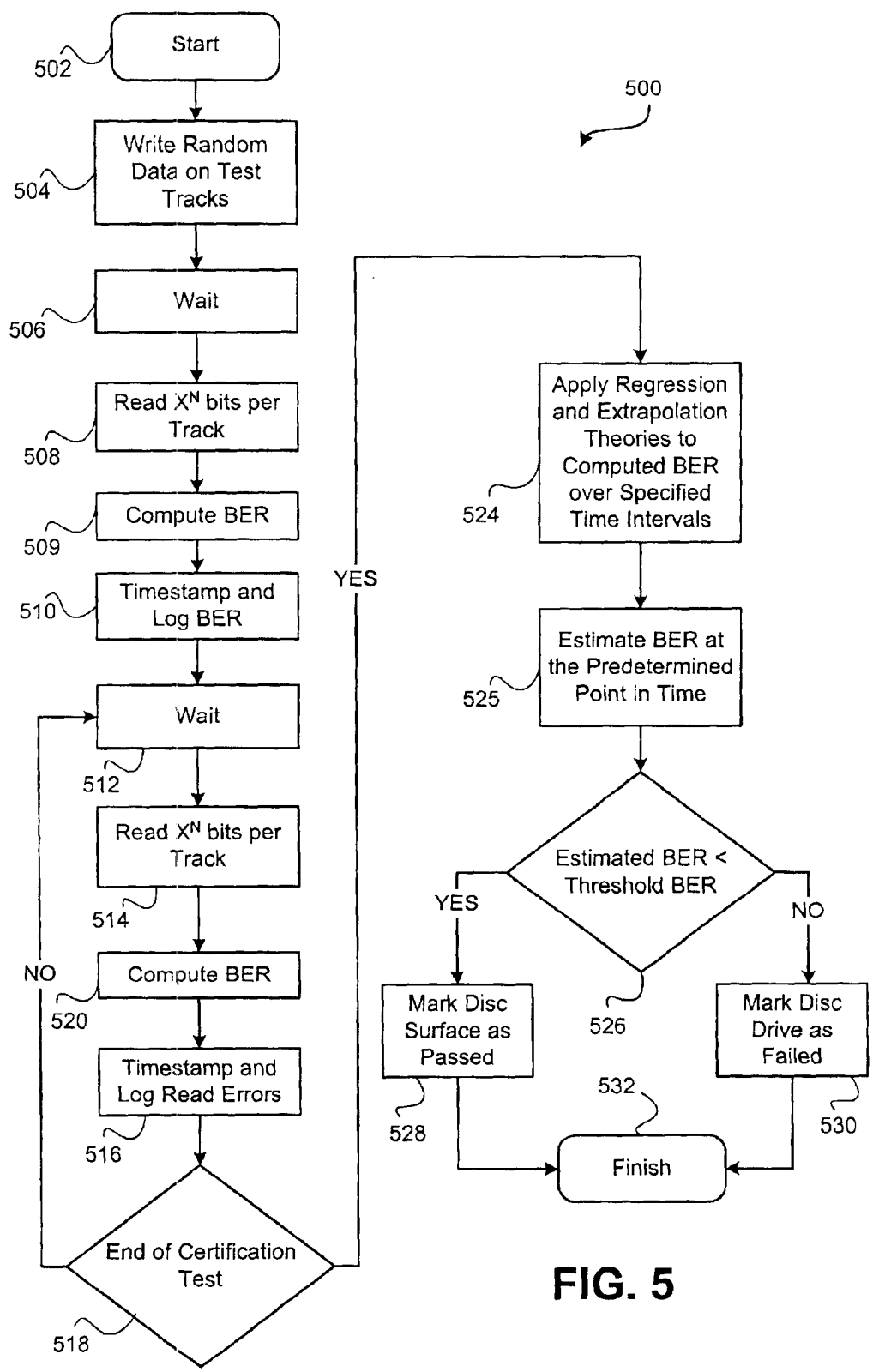
FIG. 5 is a flow diagram that illustrates operational characteristics shown in FIG. 4 in more detail in accordance with an embodiment of the present invention.
Figure 7:
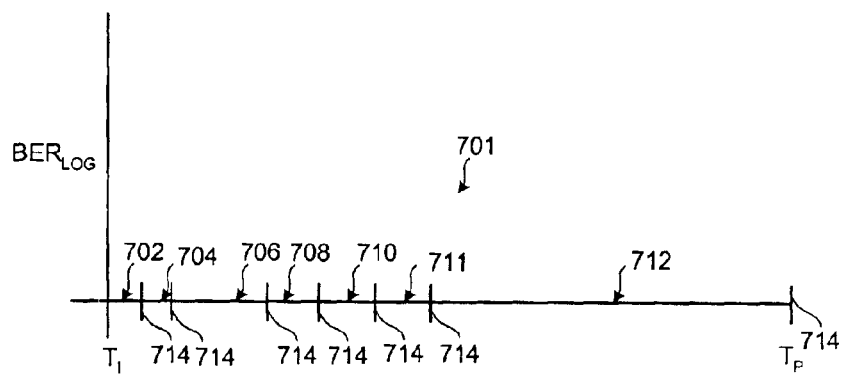
FIG. 7 is a timeline used to estimate bit error rate for disc media at a predetermined time in accordance with an embodiment of the present invention.

FIG. 5 is a BER estimation process 500 more particularly illustrating operations shown in the BER estimation process 400 in accordance with an embodiment of the present invention. Specifically, the BER estimation process 500 illustrated in FIG. 5 extrapolates BER measurements for a recordable surface of a data storage disc 108 to generate a decay graph representing BER for the disc surface over a predetermined period of time. The decay graph may then be used by the process 500 to estimate BER for the disc surface at a predetermined time. An illustration of an extrapolation plot showing an exemplary decay graph is shown in FIG. 7 and described in tandem with FIG. 5 below. Although the BER estimation process 500 is described below as estimating BER for a single disc surface at the predetermined time, the process 500 may be sequentially or simultaneously executed to estimate BER for all disc surfaces in a disc drive 100 as the drive 100 undergoes a certification test. The predetermined time period is preferably divided into a plurality of time intervals. The estimation process 500 measures BER for the disc surface over each time interval. The BER measurements are preferably taken at points in time separating each time interval. These points in time separating each time interval are referred to herein as "interval points."

In accordance with an exemplary embodiment, FIG. 7 shows a timeline 701 illustrating a predetermined time period ($T_P$-$T_I$) beginning at an initial time ($T_I$), which corresponds to the beginning of the certification process, and more particularly to the time when random data is written to test tracks 330 by the write operation 504 (see below), and concluding at the predetermined time ($T_P$). The time period ($T_P$-$T_I$) is divided into a plurality of predefined time intervals 702, 704, 706, 708, 710, 711 and 712. For illustration purposes, the first time interval 702 may be referred to as an "initial" time interval, the last time interval may be referred to as a "final" time interval, and all intervals in between the first time interval 702 and the last time interval 712 may be referred to as "next" time intervals. The initial time interval 702 begins after random data is written to the disc surface and concludes at the start of the next time interval. Each time interval begins and concludes with an interval point 714.

The initial time interval 702 and the next time intervals 704, 706, 708, 710 and 711 are preferably intervals of time occurring during certification testing. In contrast, the final time interval 712 is preferably an interval of time following the certification test. More specifically, the final time interval 712 preferably begins at the conclusion of the next time interval 711 and concludes at the end of the expected life of the disc drive 100. As such, the final time interval 712 may be substantially greater in time than any of the other time intervals 702, 704, 706, 708, 710 and 711, as noted above.

Although FIG. 7 is shown having six (6) time intervals during the certification test, the extrapolation process 600 may utilize any number of time intervals to estimate BER for the disc surface at the predetermined time. Indeed, the timeline 701 illustrates but one example of a division of a predetermined time period ($T_P$-$T_I$) into a specified number of time intervals 702, 704, 706, 708, 710, 711 and 712 and should not be considered as limiting the present invention to the number of time intervals shown on the timeline 701. In accordance with a preferred embodiment, the time intervals 702, 704, 706, 708, 710, and 711 may be equal logarithmic time periods. Indeed, the final time interval 712 may be an equivalent logarithmic time period to the time intervals 702, 704, 706, 708, 710, and 711 occurring during the certification test. Alternatively, the final time period 712 may not be an equivalent time period to the time intervals 702, 704, 706, 708, 710, and 711 occurring during the certification test. Furthermore, the time intervals 702, 704, 706, 708, 710, and 711 may be equivalent real time periods, wherein the final time interval 712 is the only distinct interval with respect to period, or length, of time. In accordance with an alternative embodiment, each time interval 702, 704, 706, 708, 710, 711 and 712 may be distinct in both real and logarithmic time with each other time interval 702, 704, 706, 708, 710, 711 and 712. That is, no two "next" time intervals may equal time periods with respect to either logarithmic or real time.

The BER estimation process 500 comprises an operation flow beginning with a start operation 502 and concluding with a terminate operation 532. Because the BER estimation process 500 is an exemplary embodiment of the BER estimation process 400, the start operation 502 and the terminate operation 532 are equivalent to the start operation 402 and the terminate operation 418, respectively, both described above. From the start operation 502, operation flow passes to a write operation 504. The write operation 504 writes random data on test tracks 330 located on the system area of the data storage disc surface. As described above, the system area is preferably the area on the disc surface to which the BER estimation process 500 is applied. In accordance with an exemplary embodiment of the present invention, the system area contains, and thus the write operation 504 writes to, three (3) test tracks 330 located on the system area on the disc surface. The data written to the disc 108 by the write operation 504 is random data, i.e., of no specific data type, because the data will only be used by the BER estimation process 500 to determine BER for the test tracks 330 on the disc surface over time. Following the write operation 504, operation flow passes to an initial wait operation 506.

The initial wait operation 506 delays the BER estimation process 500 for a predefined time delay. The length (in time) of the predefined time delay is preferably determined by length (in time) of the time interval that begins following the write operation 504 and concludes at a first interval point. Thus, the initial wait operation 506 delays the estimation process 500 for a period in time substantially equivalent to the length (in time) of the initial time interval. The length in time, or period, of each time interval is a design factor defined during disc drive development and selected to accurately estimate BER at the predetermined time using conventional regression and extrapolation procedures. As such, the time intervals are preferably equal periods of time with respect to a logarithmic time scale. Alternatively, the time intervals may be staggered with respect to both logarithmic and real time rather than all being equivalent in either real or logarithmic time). That is, the time intervals are preferably equivalent periods of logarithmic time, but may also be staggered such that each time interval comprises a distinct period of both logarithmic and real-time. Indeed, the final time interval in most cases is substantially larger than the next to final time interval because a certification test for a disc drive 100 is typically less than 30 hours, whereas the anticipated life of a drive 100 may be as lengthy as 5 to 10 years. Moreover, in an attempt to shorten certification test time, it may be more beneficial to terminate the estimation process 500 as early in the process 500 as possible, thereby taking fewer BER measurements or shortening the time intervals during the certification process.

Following the initial wait operation 506, operation flow passes to a read operation 508. The read operation 508 reads a predetermined number ($X^N$) of data bits on each test track 330 at the first interval point separating the initial time interval and a next time interval. This predetermined number ($X^N$) is defined during drive development as a number that may accurately test BER at the specified interval points. In accordance with an exemplary embodiment, the read operation 508 reads the predetermined number ($X^N$) of data bits in triplet, i.e., three times, on each test track 330. Again, reading each track 330 in triplet is a design factor and should not be considered to limit the scope of the present invention. Indeed, the read operation 508 may read $X^N$ data on each test track 330 any given number of times at an interval point. After each test track 330 has been read by the read operation 508, operation flow passes to a compute operation 509.

The first compute operation 509 computes the BER for the disc surface at the first interval point by dividing the number of errors encountered by the total number of bits read on the test tracks 330 during the first interval point. For instance, if Y number of errors were encountered on the test tracks 330 at the first interval point, the compute operation 509 divides Y by $3*X^N$, the result of which represents BER for the disc surface at the first interval point. After the first compute operation 520 has computed BER for the disc surface at each interval point, operation flow passes to a log operation 510. The log operation 510 builds a decay table that records BER computed for the disc surface at each interval point during the certification process. That is, the log operation 510 records the BER computed for the test tracks 330 at the first interval point in the decay table. Because BER for the disc surface is measured and logged at multiple interval points during the estimation process 800, the log operation 510 further time stamps the BER computation for the surface on the decay table to distinguish between interval points to which each logged BER computation corresponds. Following the log operation 510, operation flow passes to a next wait operation 512. The next wait operation 512 delays the BER estimation process 500 for a predefined time delay. The period of the predefined time delay is equivalent to the period of the current time interval. At the "next" interval point, i.e., the interval point occurring at the end of the current time interval, operation flow passes to a next read operation 514.

The next read operation 514 operates in a similar fashion to the read operation 508 in that the read operation 514 reads a predetermined number ($X^N$) of data bits on each test track 330. Specifically, and as the case with the read operation 508, the next read operation 514 reads the predetermined number ($X^N$) of data bits on each track three times. Following the next read operation 514, operation flow passes to a next compute operation 520. The next compute operation 520 computes BER for the disc surface at the "next" interval point by dividing the number of errors encountered by the total number of bits read on the test tracks 330 at the "next" interval point. For instance, if Y number of errors were encountered on the test tracks 330 at a selected interval point, the next compute operation 520 divides Y by $3*X^N$, the result of which represents BER for the disc surface at that interval point. After the compute operation 520 has computed BER for the disc surface at the "next" interval point, operation flow passes to a next log operation 516.

The next log operation 516 continues building the decay table started by the log operation 510. Specifically, the next log operation 516 records BER for the disc surface at the "next" interval point. The next log operation 516 time stamps the measured BER on the decay table to distinguish between interval points to which each logged BER computation corresponds. Following the next log operation 516, operation flow passes to a query operation 518.

The query operation 518 determines whether the certification test has concluded. If the certification test has not concluded, operation flow returns to the next wait operation 512. The next wait operation 512 delays the BER estimation process 500 until the next predefined interval point. At the next predefined interval point, operation flow continues as previously described. If, however, the query operation 518 determines that the certification test has concluded, operation flow passes to an extrapolate operation 524.

Figure 6:
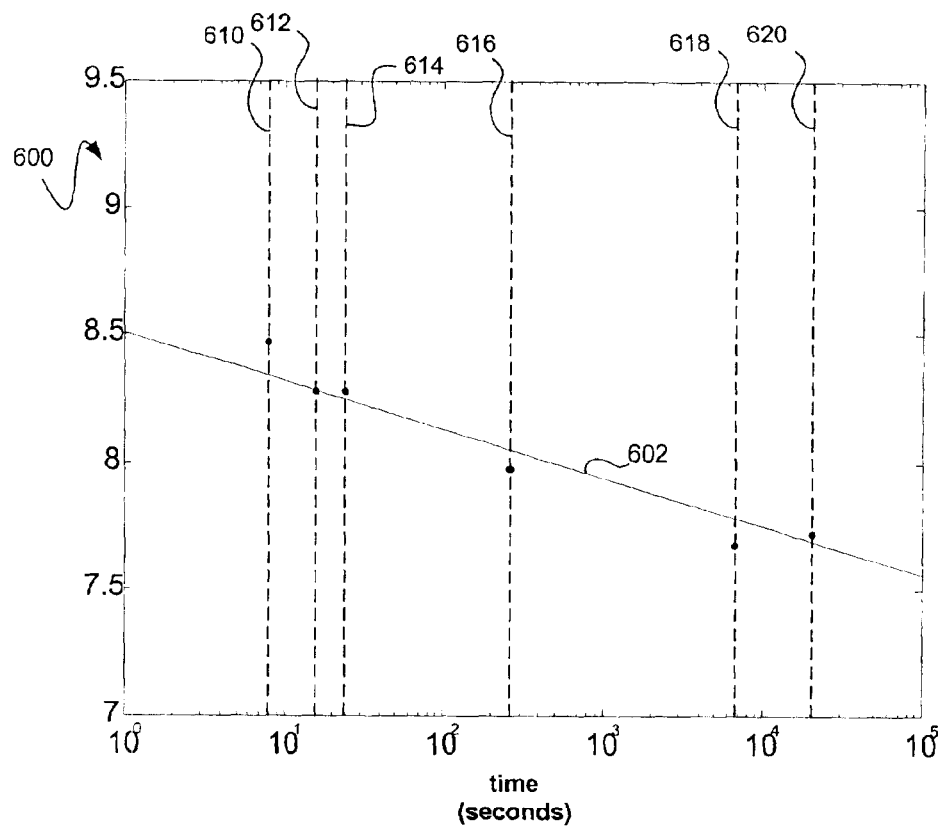
FIG. 6 is a graphical representation of bit error rate measurements for disc media extrapolated over time intervals of a certification test.

The extrapolate operation 524 utilizes conventional regression and extrapolation theories to generate a decay graph representing BER for the disc surface over the predetermined time period. Specifically, the extrapolate operation 524 extrapolates the computed BER for the test tracks 330 over the time intervals occurring within the certification test to generate the decay graph for the disc surface. FIG. 6 shows an extrapolation plot 600 depicting BER measurements at interval points 610, 612, 614, 616, 618 and 620 during the certification test in accordance with an embodiment of the present invention. The extrapolation plot 600 depicts a decay graph 602 generated by extrapolating the computed BER measurements. Although the decay graph 602 is shown in FIG. 6 as a linear graph, the decay graph 602 may be parabolic, hyperbolic, or any other type of non-linear graph that may be derived from any conventional algorithmic or mathematical analysis theorems. Because the BER estimation process 500 may be utilized to build an extrapolation plot, such as the extrapolation plot 600 shown and described in FIG. 6, FIGS. 5 and 6 are described in tandem below.

The vertical axis of the extrapolation plot 600 represents BER on a logarithmic scale. The horizontal axis of the extrapolation plot 600 represents the time of the certification test in a logarithmic time scale. As such, the extrapolation plot 600 depicts the time intervals 610, 612, 614, 616, 618 and 620 occurring during the certification test, i.e., the initial and next time intervals, but not the final time interval of the estimation process 500. Specifically, the interval points are shown on the extrapolation plot 600 as initial interval point 610 and next interval points 612, 614, 616, 618 and 620. Following the extrapolate operation 524, operation flow passes to an estimate operation 525.

The estimate operation 525 estimates BER for the disc surface at the predetermined time using the decay graph 602.

The estimate operation 525 performs this estimation by extending the decay graph 602 to the predetermined time while maintaining the slope of the line 602. As described above, the predetermined time may correspond to the concluding interval point of the final time interval. In accordance with an exemplary embodiment of the present invention, the predetermined time may represent the end of the expected life for the disc drive. Because the anticipated life of a drive 100 may vary drastically between disc drive models, the extrapolation plot 600 is shown as a snapshot only including the initial and next time intervals, which are noted above, occur during the certification test. Broadly stated, the predetermined time may be any time occurring after the next interval point 620. Furthermore, the extrapolation plot 600 is provided as an exemplary embodiment and should not be considered limiting with respect to period or occurrence of the time intervals. Indeed, it should be appreciated that time intervals may be any period of time, and that the interval points may occur any time as well. Following the estimate operation 525, operation flow passes to a query operation 526.

The query operation 526 compares the estimated BER at the predetermined time to a threshold BER. As described above, the threshold BER is a BER value determined by the disc drive developer to be an unsatisfactory BER if measured at the predetermined time. As such, by setting the predetermined time as the end of the anticipated life of the drive 100, a developer is given insight as to whether the drive 100 will still be operable to satisfactorily store data for as long as the drive 100 is reasonably expected to be in operation. Thus, the threshold BER may be a value that corresponds to the absolute highest, or insufficient, BER that may occur at the end of the drive's anticipated life. If the query operation 526 determines that the estimated BER is less than the threshold BER, operation flow passes to a mark success operation 528. The mark success operation 528 marks the disc 108 as having at least one disc surface that would have a satisfactory BER at the predetermined time. From the mark success operation 528, operation flow concludes with the termination operation 532.

If, however, the query operation 526 determines that the estimated BER is greater than the threshold BER, operation flow passes to a mark failure operation 530. The mark failure operation 530 marks the disc 108 as having at least one disc surface that will not have a satisfactory BER at the predetermined time. As such, the disc surface has a decay rate such that the disc 108 will be inoperable to store data at the predetermined time, which may be end of the anticipated life of the disc drive 100 in accordance with an exemplary embodiment of the present invention. A disc drive 100 marked as failed by the mark failure operation 530 may be pulled from development and thereafter refused shipment to a customer. Following the mark failure operation 530, operation flow concludes with the terminate operation 532.

Figure 8:
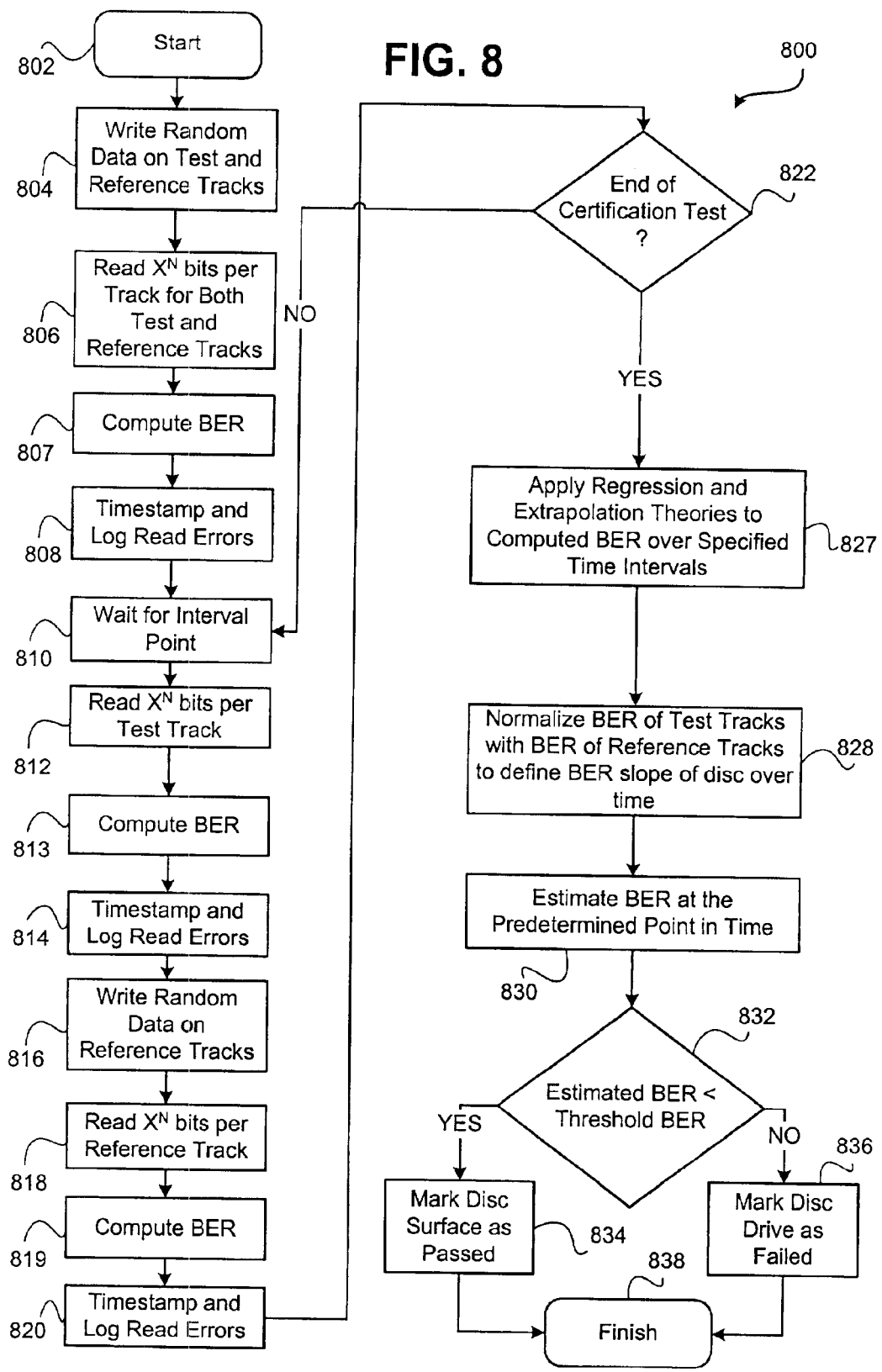
FIG. 8 is a flow diagram that illustrates operational characteristics for estimating decay-based bit error rate for disc media at a predetermined time in accordance with an alternative embodiment of the present invention.

FIG. 8 is a BER estimation process 800 more particularly illustrating operations shown in the BER estimation process 400 in accordance with an alternative embodiment of the present invention. As with the estimation process 500 illustrated in FIG. 5, the BER estimation process 800 illustrated in FIG. 8 extrapolates BER for a recordable surface of a data storage disc 108 over a predetermined time period in order to estimate BER on the disc surface at a predetermined time. Similarly, like the estimation process 500, the predetermined time period is divided into a plurality of time intervals and the estimation process 800 measures BER of the disc surface over each time interval. Because the estimation process 800 measures and thereafter plots BER over each time interval at the interval points separating the intervals, FIG. 7 is not described in detail as with the estimation process 500 above, but rather is only described in tandem with FIG. 8 for illustrative purposes. The process 500 described in FIG. 5 and the process described in FIG. 8 differ in that the estimation process 800 illustrated in FIG. 8 normalizes the BER graph for each disc surface based on a measure of BER predominantly affected by non-decay phenomenon. Although the BER estimation process 800 is described below as estimating BER for a single disc surface at the predetermined time, the process 800 may be sequentially or simultaneously executed to estimate BER for all disc surfaces in a disc drive 100 as the drive 100 undergoes a certification test.

The BER estimation process 800 comprises an operation flow beginning with a start operation 802 and concluding with a terminate operation 838. Because the BER estimation process 800 is an alternative embodiment of the BER estimation process 400, the start operation 802 and the terminate operation 832 are equivalent to the start operation 402 and the terminate operation 418 described above. From the start operation 802, operation flow passes to a write operation 804. The write operation 804 writes random data on test tracks 330 and reference tracks 334 located on the system area on the disc surface. As described above, the system area is preferably the area on the disc surface to which the BER estimation process 800 is applied. In accordance with an exemplary embodiment of the present invention, the system area contains, and thus the write operation 804 writes to, three (3) test tracks 330 and three (3) reference tracks 334 located in the system area on the disc surface. The data written to the disc surface by the write operation 804 is random data, i.e., of no specific data type, because the data will only be used by the BER estimation process 800 to determine raw error values for tracks on the disc surface over time.

Following the write operation 804, operation flow passes directly to a read operation 806. In contrast, the BER estimation process 500 illustrated in FIG. 5 is delayed prior to the read operation 508 over a non-zero time interval by a wait operation 506. Referring back to FIG. 8, the read operation 806 is performed immediately following the write operation 804 in accordance with a preferred embodiment of the present invention. Although the first non-zero time interval preferably occurs following the read operation 806, the first interval point occurs at the read operation 806. That is, the read operation 806 occurs on the next, or subsequent, disc revolution. Alternatively, the BER estimation process 800 may comprise a wait operation between the write operation 804 and the read operation 806 for delaying the process 800 over a predefined time interval. That is, the first time interval of a non-zero period may alternatively occur between the write operation 804 and the read operation 806. Regardless of the period of the initial time interval, the read operation 806 is referred to being performed at a first interval point.

The read operation 806 reads a predetermined number ($X^N$) of data bits on each test track 330 and each reference track 334. This predetermined number ($X^N$) may be defined during drive development as a number that accurately tests BER at the specified interval points. In accordance with an exemplary embodiment, the read operation 806 reads the predetermined number ($X^N$) of data bits in triplet, i.e., three times, on each test track 330 and reference track 334. Again, reading each test track 330 and reference track 334 in triplet is a design factor and should not be considered to limit the scope of the present invention. Indeed, the read operation 806 may read $X^N$ data on each test track 330 any given number of times at an interval point. After each test track 330 has been read by the read operation 806, operation flow passes to a first compute operation 807.

The first compute operation 807 computes BER due to decay phenomena for the disc surface at the first interval point by dividing the number of errors encountered while reading the test tracks 330 at the first interval point by the total number of bits read on the test tracks 330 at the first interval point. For instance, if Y number of errors were encountered on the test tracks 330 at the first interval point, the compute operation 807 divides Y by $3*X^N$, the result of which represents BER due to decay phenomena of the disc surface at the first interval point. The first compute operation 807 also computes BER due to non-decay phenomena for the disc surface at the first interval point by dividing the number of errors encountered while reading the reference tracks 334 at the first interval point by the total number of bits read on the reference tracks 334 at the first interval point. For instance, if Z number of errors were encountered on the reference tracks 334 at the first interval point, the first compute operation 807 divides Z by $3*X^N$, the result of which represents BER due to non-decay phenomena of the disc surface at the first interval point. After the first compute operation 807 has computed BER due to both decay and non-decay phenomena for the disc surface at the first interval point, operation flow passes to a first log operation 808.

The first log operation 808 builds a BER table that records BER for the test tracks 330 and BER for the reference tracks 334 computed for each interval point occurring during the certification test. That is, the first log operation 808 records BER for the test tracks 330 and BER for the reference tracks 334 computed at the first interval point on the decay table. Because bit error rates are measured and logged at multiple interval points during the estimation process 800, the log operation 808 also time stamps BER computed for the test tracks 330 and BER computed for the reference tracks 334 on the decay table to distinguish between interval points to which each logged BER computation corresponds. Following the log operation 808, operation flow passes to a wait operation 810.

The wait operation 810 delays the BER estimation process 800 for a predefined time delay. The length (in time) of the predefined time delay is preferably determined by length (in time) of the time interval that begins following the read operation 806 and concludes at the next interval point. Thus, the wait operation 810 delays the estimation process 800 for a period in time substantially equivalent to the length (in time) of the current time interval. The period of each time interval is a design factor defined during disc drive development and selected to accurately estimate BER at the predetermined time using conventional regression and extrapolation procedures. As such, the time intervals are preferably equal periods of time with respect to a logarithmic time scale. Alternatively, the time intervals may be staggered with respect to both logarithmic and real time rather than all being equivalent in either real or logarithmic time. That is, the time intervals are preferably equivalent periods of logarithmic time, but may also be staggered such that each time interval comprises a distinct period of both logarithmic and real-time. Indeed, the final time interval in most cases is substantially larger than the next to final time interval because a certification test for a disc drive 100 typically lasts less than 30 hours, whereas the anticipated life of a drive 100 may be as lengthy as 8 to 10 years. Moreover, in an attempt to shorten certification test time, it may be more beneficial to terminate the estimation process 800 as early in the process 800 as possible, thereby taking fewer BER measurements or shortening the time intervals during the certification process. At the "next" interval point, i.e., the interval point occurring at the end of the current time interval, operation flow passes to a test track read operation 812.

The test track read operation 812 operates in a similar fashion to the read operation 806 in that the test track read operation 812 reads a predetermined number ($X^N$) of data bits on each test track 330. However, the test track read operation 812 does not read the reference tracks 334. Specifically, and as the case with the read operation 806, the test track read operation 812 reads the predetermined number ($X^N$) of data bits on each test track 330 in triplet. Following the test track read operation 812, operation flow passes to a test track BER compute operation 813.

The test track BER compute operation 813 computes BER due to decay phenomena on the disc surface at the "next" interval point by dividing the number of errors read on the test tracks 330 at the "next" interval point by the total number of bits read on the test tracks 330 during the "next" interval point. For instance, if Y number of errors were encountered on the test tracks 330 at the "next" interval point, the test track BER compute operation 813 divides Y by $3*X^N$, the result of which represents BER due to decay phenomena of the disc surface at the "next" interval point. After the test track BER compute operation 813 has computed BER due to decay phenomena for the disc surface at the "next" interval point, operation flow passes to a test track log operation 814.

The test track log operation 814 continues building the BER table started by the log operation 808 by recording the BER computed for the test tracks 330 at the "next" interval point on the decay table. The test track log operation 814 also time stamps the BER of test tracks 330 on the decay table to distinguish between interval points to which each logged BER computation corresponds. Following the test track log operation 814, operation flow passes to a reference track write operation 816.

The reference track write operation 816 first erases the data written to the reference tracks 334 and then re-writes random data to the reference tracks 334. As noted above, the system area may include, and thus the reference track write operation 816 may write to, any number of reference tracks 334. However, in accordance with an exemplary embodiment, the BER estimation process 800 utilizes three (3) reference tracks, thus, the system area preferably includes and the reference track write operation 816 preferably writes to, these three tracks 334. Following the reference track write operation 816, operation flow passes to a reference track read operation 818.

The reference track read operation 818 operates in a similar fashion to the read operation 806 in that the reference track read operation 818 reads a predetermined number ($X^N$) of data bits on each reference track 334. However, the reference track read operation 818 does not read the test tracks 330, which at this point in the process 800 have already been read by test track read operation 812. Specifically, and as the case with the read operation 806, the reference track read operation 818 reads the predetermined number ($X^N$) of data bits on each reference track 334 in triplet.

Following the reference track read operation 818, operation flow passes to a reference track BER compute operation 819. The reference track BER compute operation 819 computes BER due to non-decay phenomena for the disc surface at the "next" interval point by dividing the number of errors read on the reference tracks 334 at the "next" interval point by the total number of bits read on the reference tracks 334 during the "next" interval point. For instance, if Z number of errors were encountered on the reference tracks 334 at the "next" interval point, the reference track BER compute operation 819 divides Z by $3*X^N$, the result of which represents BER due to non-decay phenomena on the disc surface at the "next" interval point. Following the reference track BER compute operation 819, operation flow passes to a reference track log operation 820. The reference track log operation 820 continues building the decay table started by the log operation 808 by recording BER computed for the reference tracks 334 at the "next" interval point on the decay table. The reference track log operation 820 also time stamps the BER computed for the reference tracks 334 on the decay table to distinguish between interval points to which each logged BER computation corresponds. Following the test track log operation 820, operation flow passes to a query operation 822.

The query operation 822 determines whether the certification test has concluded. If the certification test has not concluded, operation flow returns to the wait operation 810. The wait operation 810 delays the BER estimation process 800 until the next predefined interval point. At the next predefined interval point, operation flow continues as previously described. If, however, the query operation 822 determines that the certification test has concluded, operation flow passes to an extrapolate operation 827.

Figure 9:
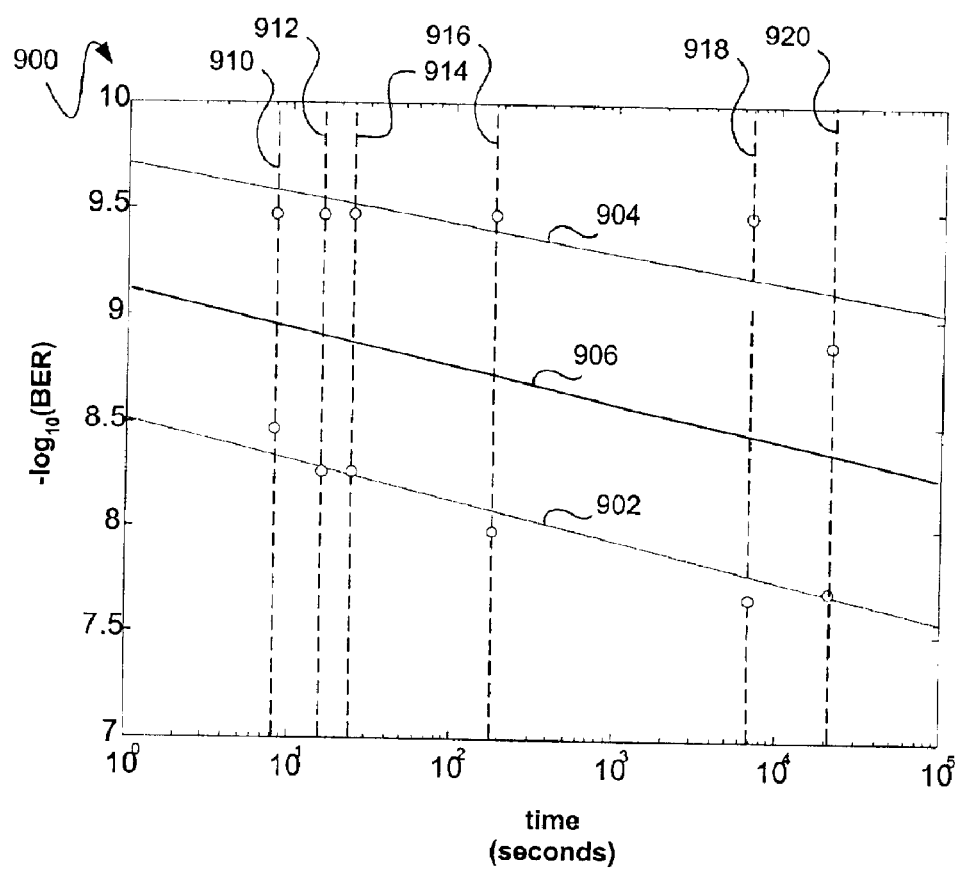
FIG. 9 is a graphical representation of decay and non-decay based bit error rate measurements for disc media extrapolated over time intervals of a certification test.

The extrapolate operation 827 utilizes conventional regression and extrapolation theories to generate a normalized decay graph for the disc surface. Specifically, the extrapolate operation 827 extrapolates BER of the test tracks 330 over the time intervals occurring within the certification test to generate a decay graph for the disc surface. Similarly, the extrapolate operation 827 extrapolates BER for the reference tracks 334 over the time intervals occurring within the certification test to generate a non-decay graph for the disc surface. FIG. 9 shows an extrapolation plot 900 depicting plotted BER measurements due to both decay and non-decay phenomena at interval points during the certification test in accordance with an embodiment of the present invention. The extrapolation plot 900 also depicts decay graphs 902 and non-decay graphs 904 generated by extrapolating the BER computations due to both decay and non-decay phenomena, respectfully. Although the graphs 902, 904 and 906 are shown in FIG. 9 as a linear graph, the graphs 902, 904 and 906 may be parabolic, hyperbolic, or any other type of non-linear graph 902, 904 and 906 that may be derived from any conventional algorithmic or mathematical analysis theorems. Because the extrapolation operation 827 may be utilized to generate the decay graph 902 and the non-decay graph 904 shown and described in FIG. 9, FIGS. 8 and 9 are described in tandem below.

The vertical axis of the extrapolation plot 900 represents BER on a logarithmic scale. The horizontal axis of the extrapolation plot 900 represents the time of the certification test in a logarithmic time scale. The extrapolation plot 900 depicts the time intervals occurring during the certification test, i.e., the initial and next time intervals, but not the final time interval of the estimation process 800. The interval points are shown on the extrapolation plot 900 as initial interval point 910 and next interval points 912, 914, 916, 918 and 920. Following the extrapolate operation 827, operation flow passes to a normalize operation 828.

The normalize operation 828 normalizes the decay graph 902 by the non-decay graph 904 to render a normalized decay graph 906 for the disc surface that accurately represents a decay-based BER slope for the disc surface over time. By normalizing the decay graph 902 by the non-decay graph 904, a measure of BER predominantly affected only by decay phenomena, and not non-decay phenomena, is generated and operable to use in estimating BER at a predetermined time, such as, without limitation, the end of an expected life for the disc drive 100. Following normalize operation 828, operation flow passes to an estimate operation 830.

The estimate operation 830 estimates BER for the disc surface at the predetermined time using the normalized decay graph 906. The estimate operation 830 performs this estimation by extending the normalized decay graph 906 to the predetermined time while maintaining the slope of the graph 906. As described above, the predetermined time may correspond to the concluding interval point of the final time interval. As mentioned in accordance with an exemplary embodiment of the present invention, this predetermined time may represent the end of the expected life for the disc drive 100. Because the anticipated life of a drive 100 may vary drastically between disc drive models, the extrapolation plot 900 is shown as a snapshot only including the initial and next time intervals. Broadly stated, the predetermined time may be any time occurring after the $10^5$ interval point. Furthermore, the extrapolation plot 900 is provided as an exemplary embodiment and should not be considered limiting with respect to length in time intervals or occurrence of interval points. Indeed, it should be appreciated that time intervals may be any length of time, and thus, the interval points may occur any time, as well. Following the estimate operation 830, operation flow passes to a query operation 832.

The query operation 832 compares the estimated BER at the predetermined time to a threshold BER. As described above, the threshold BER is a BER value determined by the disc drive developer to be an unsatisfactory BER if measured at the predetermined time. As such, by setting the predetermined time as the end of the anticipated life of the drive 100, a developer may estimate if the drive 100 will still be operable to satisfactorily store data for as long as the drive 100 is reasonably expected to be in operation. Thus, the threshold BER may be a value that corresponds to the absolute highest, or insufficient, BER that may occur at the end of the anticipated life of the disc drive. If the query operation 832 determines that the estimated BER is less than the threshold BER, operation flow passes to a mark success operation 834. The mark success operation 834 marks the disc 108 as having at least one disc surface that most likely has a satisfactory BER at the predetermined time. From the mark success operation 834, operation flow concludes with the terminate operation 838.

If, however, the query operation 832 determines that the estimated BER is greater than the threshold BER, operation flow passes to a mark failure operation 836. The mark failure operation 836 marks the disc drive 100 as having at least one disc surface that will not have a satisfactory BER at the predetermined time. As such, the disc 108 most likely has a decay rate that will render the disc 108 inoperable to store data at the predetermined time, which may be end of the expected life of the disc drive 100 in accordance with an exemplary embodiment of the present invention. A disc drive 100 marked as failed by the mark failure operation 836 may be pulled from development and thereafter refused shipment to a customer. Following the mark failure operation 836, operation flow concludes with the terminate operation 838.

In summary, the present invention may be viewed as a method (such as 400) for estimating bit error rate for disc media (such as 108) in a disc drive (such as 100) at a predetermined time (such as $T_P$, 714) occurring within a predetermined time period (such as $T_P$-$T_I$) divided into a plurality of time intervals (such as 702, 704, 706, 708, 710 and 712). The method includes a step of writing (such as in operation 404) data to the disc media beginning at an initial time interval (such as 702), a step of reading (such as in operation 406) the data recorded on the disc media at specified interval points (such as 714) during the predetermined time period, a step of computing a bit error rate value (such as in operation 408) for the disc media at each specified interval point to create a decay graph (such as 602) representative of bit error rate changes for the disc media over the time intervals, and extrapolating the decay graph to predict a bit error rate at the predetermined time. The writing step may write data to a test track (such as 330) on the disc media and the reading step may read the data recorded on the test track. Consequently, the computing step may compute a raw error value for the test track equal to a quantity of errors encountered while reading the test track at each specified interval point and determine the bit error rate value for the disc media at each specified interval point by dividing the computed raw error value of the test track at each specified interval point with a total number of data bits read at each specified interval point. Alternatively, the writing step may write data to a plurality of test tracks on the disc media and the reading step may read the data recorded on the test tracks. Consequently, the computing step may include a step of computing a raw error value for each test track at each specified interval point equal to a quantity of errors encountered while reading the test tracks at the specified interval points and a step of computing a bit error rate value for the disc media at each specified interval point by dividing the computed raw error values of the test tracks at each specified interval point with a total number of data bits read on the test tracks at each specified interval point.

The method may further include a step of comparing (such as in operation 412) the estimated bit error rate at the predetermined time to a threshold bit error rate value for the disc media at the predetermined time. If the estimated bit error rate is greater than or equal to the threshold bit error rate, the method may include a step of marking (such as in operation 416) the disc drive as a failure. In accordance with an embodiment, the predetermined time period may be equivalent to an expected lifetime of the disc drive beginning at a certification test and ending at the predetermined time. As such, the writing step, the reading step, the computing step and the extrapolating step may be performed during the certification test. Indeed, the marking step may further include removing the disc drive from the certification test such that the disc drive is thereafter refused shipment to a customer.

In accordance with an alternative embodiment (such as 800), the method may include a step of computing (such as in operations 807 and 819) non-decay based bit error rate values for the disc media at each specified interval point. The non-decay based bit error rate values may be representative of bit error rate change affected by non-decay phenomena. Consequently, the method may include a step of normalizing (such as in operation 828) the bit error rate values for the disc media at each specified interval point by non-decay based bit error rate values for the disc media at corresponding specified interval points such that the extrapolating step (such as in operation 827) creates a normalized decay graph (such as 906) representing bit error rate change for the disc media affected by decay phenomena, wherein the estimated bit error rate linked to the predetermined time by the normalized decay graph is an estimated decay-based bit error rate for the disc media at the predetermined time.

In the alternative embodiment described above, the computing step may include steps of writing (such as in operation 804) data to a reference track (such as 334) on the disc media at an initial interval point (such as $T_I$, 714) corresponding to the beginning of the initial time interval (such as 702), reading (such as in operation 806) the data recorded on the reference track (such as 334) during the initial time interval (such as 702), re-writing (such as in operation 816) the reference track with replacement data at each specified interval point throughout the predetermined time period and thereafter reading (such as in operation 818) the replacement data recorded on the reference track beginning at each specified interval point immediately after the data is committed to the disc media, computing a raw error value equal to a quantity of errors encountered while reading the reference track beginning at each specified interval point, and computing (such as in operation 819) the non-decay based bit error rate value for the disc media at each specified interval point by dividing the computed raw error value of the reference track at each specified interval point with a total number of data bits read. Furthermore, the method of the alternative embodiment may include a step of comparing (such as in operation 832) the estimated decay-based bit error rate at the predetermined time to a threshold bit error rate value for the disc media at the predetermined time. Consequently, if the estimated decay-based bit error rate is greater than or equal to the threshold bit error rate, the method of the alternative embodiment may include marking (such as in operation 836) the disc drive as a failure.

In accordance with another embodiment, the present invention may be viewed as a computer-readable program storage device which tangibly embodies a program of instructions executable by a computer system to measure raw error values for tracks (such as 330 and 334) of a disc surface over specified time intervals (such as 702, 704, 706, 708, 710, and 711) and estimate therefrom BER for the disc surface at any given time during the expected life (such as $T_P$-$T_I$) of the disc drive. Therefore, each of the above-described operations and implementations may be performed by a program storage device readable by a computer system tangibly embodying a program of instructions executable by the computer system to perform a method for estimating bit error rate for disc media in a disc drive at a predetermined time occurring within a predetermined time period (such as $T_P$-$T_I$) divided into a plurality of time intervals (such as 702, 704, 706, 708, 710, 711 and 712).

In accordance with yet another embodiment, the present invention may be viewed as disc drive (such as 100) having a data storage disc rotatably mounted to a base plate (such as 102) and an actuator arm (such as 114) mounted on the base plate adjacent the disc. The disc drive may include a transducer (such as 118) attached to the actuator arm operable to write data to and thereafter read data stored on a recordable media of the disc over a predetermined time period (such as $T_P$-$T_I$) divided into a plurality of time intervals (such as 702, 704, 706, 708, 710, 711 and 712). The disc drive may also include a means for determining (such as 400, 500 and 800) whether the recordable media will be inoperable to store data at a predetermined time (such as $T_P$, 714) by measuring bit error rates for the media at specified interval points (such as 702, 704, 706, 708, 710, and 711) during the predetermined time period and estimating therefrom a bit error rate for the media at the predetermined time.

The predetermined time period may represent an expected lifetime of the disc drive beginning at a certification test and ending at the predetermined time.

In accordance with a preferred embodiment, the transducer writes data to a test track (such as 330) on the recordable media at an initial interval point (such as $T_I$ 714) and thereafter reads the data recorded on the test track at the specified interval points. As such, the determining means may include a means (such as 408) for computing a bit error rate value for the recordable media at each specified interval point by dividing a quantity of errors encountered while reading the test track at each specified interval point by a total number of data bits read on the test track at each specified interval point. Furthermore, the determining means may include a means (such as 524) for extrapolating the bit error rate values to create a decay graph (such as 602) representative of bit error rate change for the recordable media over the predetermined time period, wherein the decay graph links the predetermined time to an estimated bit error rate for recordable media. Additionally, the determining means may also include a means (such as 807 and 819) for computing non-decay based bit error rate values for the recordable media at each specified interval point. The non-decay based bit error rate values are preferably representative of bit error rate affected by non-decay phenomena. The non-decay based bit error rate values normalize the bit error rate values for the recordable media at each specified interval point such that the decay graph (such as 906) represents bit error rate change for the disc media affected by decay phenomena.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, a BER estimation procedure may be performed at times other than a certification test. Indeed, a BER estimation procedure may be performed as a stand-alone test in no way affiliated with a certification or functional test. Furthermore, the estimation procedure may be administered during research and development of a particular disc drive model. For instance, the procedure may be applied to a prototype drive. The estimation procedure may also be administered using a spin-stand. Additionally, the log operations may build decay tables that record the number of read errors, rather than actual BER, encountered on each track, test or reference, during the read operations. More particularly, the log operations may use statistical analysis to determine raw error value for the test tracks read by the read operations at the specified interval points. That is, the log operations may record the number of read errors encountered for each track, test or reference, to generate the raw error value for each track at the specified interval points. Because raw error values would be measured and logged at multiple interval points during the estimation processes, the log operations may further time stamp the raw error values for each track, test or reference, to identify the interval point on which the errors occurred. From such a decay table containing the raw error values, the compute operations may compute BER for a disc surface based on both decay and non-decay phenomena such that the estimation processes may operate as described above. Moreover, the log operations may be performed by software loaded onto a computer system administering the estimation procedures or the disc drive, in which case, the software may be firmware executable by the drive microprocessor. Indeed, the estimation process may be administered in part or wholly by the disc drive microprocessor and/or by a stand-alone computer system operating on the assembled disc drive during the certification test. Numerous other changes may be made which will readily suggest themselves to those skilled in the art and which are encompassed in the spirit of the invention disclosed and as defined in the appended claims.

What is claimed is:

1. A method for estimating bit error rate for disc media in a disc drive at a predetermined time occurring within a predetermined time period divided into a plurality of time intervals, the method comprising:
   writing data to the disc media beginning at an initial time interval;
   reading the data recorded on the disc media at specified interval points during the predetermined time period;
   computing a bit error rate value for the disc media at each specified interval point;
   extrapolating the bit error rate values to create a decay graph representative of bit error rate changes for the disc media over the predetermined time period, wherein the decay graph links the predetermined time to an estimated bit error rate for the disc media.

2. The method of claim 1 wherein the writing step writes data to a test track on the disc media and the reading step reads the data recorded on the test track, the computing step comprising:
   computing a raw error value for the test track equal to a quantity of errors encountered while reading the test track at each specified interval point; and
   determining the bit error rate value for the disc media at each specified interval point by dividing the computed raw error value of the test track at each specified interval point with a total number of data bits read at each specified interval point.

3. The method of claim 1 wherein the writing step writes data to a plurality of test tracks on the disc media and the reading step reads the data recorded on the test tracks, the computing step comprising:
   computing a raw error value for each test track at each specified interval point equal to a quantity of errors encountered while reading the test tracks at the specified interval points; and
   determining a bit error rate value for the disc media at each specified interval point by dividing the computed raw error values of the test tracks at each specified interval point with a total number of data bits read on the test tracks at each specified interval point.

4. The method of claim 1 further comprising:
   comparing the estimated bit error rate at the predetermined time to a threshold bit error rate value for the disc media at the predetermined time; and
   if the estimated bit error rate is greater than or equal to the threshold bit error rate, marking the disc drive as a failure.

5. The method of claim 4, wherein the predetermined time period is equal to an expected lifetime of the disc drive beginning at a certification test and ending at the predetermined time.

6. The method of claim 5, wherein the writing step, the reading step, the computing step and the extrapolating step are performed during the certification test.

7. The method of claim 6, wherein the marking step further comprises:
   removing the disc drive from the certification test such that the disc drive is thereafter refused shipment to a customer.

8. The method of claim 1, wherein the predetermined time period represents an expected lifetime of the disc drive beginning at a certification test and ending at the predetermined time.

9. The method of claim 8, wherein the writing step, the reading step, the computing step and the extrapolating step are performed during the certification test.

10. The method of claim 1 further comprising:
determining non-decay based bit error rate values for the disc media at each specified interval point, the non-decay based bit error rate values being representative of bit error rate change affected by non-decay phenomena; and
normalizing the bit error rate values for the disc media at each specified interval point by non-decay based bit error rate values for the disc media at corresponding specified interval points such that the extrapolating step creates a normalized decay graph representing bit error rate change for the disc media affected by decay phenomena, wherein the estimated bit error rate linked to the predetermined time by the normalized decay graph is an estimated decay-based bit error rate for the disc media at the predetermined time.

11. The method of claim 10, wherein the determining step comprises:
writing data to a reference track on the disc media at an initial interval point corresponding to the beginning of the initial time interval;
reading the data recorded on the reference track during the initial time interval;
re-writing the reference track with replacement data at each specified interval point throughout the predetermined time period and thereafter reading the replacement data recorded on the reference track beginning at each specified interval point immediately after the data is committed to the disc media; and
computing a raw error value equal to a quantity of errors encountered while reading the reference track beginning at each specified interval point; and
determining the non-decay based bit error rate value for the disc media at each specified interval point by dividing the computed raw error value of the reference track at each specified interval point with a total number of data bits read.

12. The method of claim 11 further comprising:
comparing the estimated decay-based bit error rate at the predetermined time to a threshold bit error rate value for the disc media at the predetermined time; and
if the estimated decay-based bit error rate is greater than or equal to the threshold bit error rate, marking the disc drive as a failure.

13. The method of claim 12, wherein the predetermined time period represents an expected lifetime of the disc drive beginning at a certification test and ending at the predetermined time.

14. The method of claim 13, wherein the writing step, the reading step, the computing step and the extrapolating step are performed during the certification test.

15. A program storage device readable by a computer system tangibly embodying a program of instructions executable by the computer system to perform a method for estimating bit error rate for disc media in a disc drive at a predetermined time occurring within a predetermined time period divided into a plurality of time intervals, the method comprising:
writing data to the disc media beginning at an initial time interval;
reading the data recorded on the disc media at specified interval points during the predetermined time period;
computing a bit error rate value for the disc media at each specified interval point; and
extrapolating the bit error rate values to create a decay graph representative of bit error rate changes for the disc media over the predetermined time period, wherein the decay graph links the predetermined time to an estimated bit error rate for the disc media.

16. A program storage device as defined in claim 15, wherein the writing step writes data to a test track on the disc media and the reading step reads the data recorded on the test track, the computing step comprising:
computing a raw error value for the test track equal to a quantity of errors encountered while reading the test track at each specified interval point; and
determining a bit error rate value for the disc media at each specified interval point by dividing the computed raw error value of the test track at each specified interval point with a total number of data bits read at each specified interval point.

17. A program storage device as defined in claim 15 wherein the writing step writes data to a plurality of test tracks on the disc media and the reading step reads the data recorded on the test tracks, the computing step comprising:
computing a raw error value for each test track at each specified interval point equal to a quantity of errors encountered while reading the test tracks at the specified interval points; and
determining a bit error rate value for the disc media at each specified interval point by dividing the computed raw error values of the test tracks at each specified interval point with a total number of data bits read on the test tracks at each specified interval point.

18. A program storage device as defined in claim 15, wherein the method further comprises:
comparing the estimated bit error rate at the predetermined time to a threshold bit error rate value for the disc media at the predetermined time; and
if the estimated bit error rate is greater than or equal to the threshold bit error rate, marking the disc drive as a failure.

19. A program storage device as defined in claim 18, wherein the predetermined time period is equal to an expected lifetime of the disc drive beginning at a certification test and ending at the predetermined time.

20. A program storage device as defined in claim 19, wherein the writing step, the reading step, the computing step and the extrapolating step are performed during the certification test.

21. A program storage device as defined in claim 15, wherein the predetermined time period represents an expected lifetime of the disc drive beginning at a certification test and ending at the predetermined time.

22. A program storage device as defined in claim 21, wherein the writing step, the reading step, the computing step and the extrapolating step are performed during the certification test.

23. A program storage device as defined in claim 15, wherein the method further comprises:
determining non-decay based bit error rate values for the disc media at each specified interval point, the non-decay based bit error rate values being representative of bit error rate change affected by non-decay phenomena; and
normalizing the bit error rate values for the disc media at each specified interval point by non-decay based bit error rate values for the disc media at corresponding specified interval points such that the extrapolating step creates a normalized decay graph representing bit error rate change for the disc media affected by decay phenomena, wherein the estimated bit error rate linked to the predetermined time by the normalized decay graph is an estimated decay-based bit error rate for the disc media at the predetermined time.

24. A program storage device as defined in claim 23, wherein the determining step comprises:
   writing data to a reference track on the disc media at an initial interval point corresponding to the beginning of the initial time interval;
   reading the data recorded on the reference track beginning at the initial interval point immediately after the data is committed to the disc media;
   re-writing the reference track with replacement data at each specified interval point throughout the predetermined time period and thereafter reading the replacement data recorded on the reference track beginning at each specified interval point after the data is committed to the disc media; and
   computing a raw error rate representing a quantity of errors encountered while reading the reference track beginning at each specified interval point; and
   determining the non-decay based bit error rate value for the disc media at each specified interval point by dividing the computed raw error value of the reference track at each specified interval point with a total number of data bits read.

25. A program storage device as defined in claim 24, wherein the method further comprises:
   comparing the estimated decay-based bit error rate to a threshold bit error rate value for the disc media at the predetermined time; and
   if the estimated decay-based bit error rate is greater than or equal to the threshold bit error rate, marking the disc drive as a failure.

26. A disc drive having a data storage disc rotatably mounted to a base plate and an actuator arm mounted on the base plate adjacent the disc, the disc drive comprising:
   a transducer attached to the actuator arm operable to write data to and thereafter read data stored on a recordable media of the disc over a predetermined time period divided into a plurality of time intervals; and
   means for determining whether the recordable media will be inoperable to store data at a predetermined time by measuring bit error rates for the media at specified interval points during the predetermined time period and estimating therefrom a bit error rate for the media at the predetermined time.

27. A disc drive as defined in claim 26, wherein the predetermined time period represents an expected lifetime of the disc drive beginning at a certification test and ending at the predetermined time.

28. A disc drive as defined in claim 26, wherein the transducer writes data to a test track on the recordable media at an initial interval point and thereafter reads the data recorded on the test track at the specified interval points, the determining means comprising:
   means for computing a bit error rate value for the recordable media at each specified interval point by dividing a quantity of errors encountered while reading the test track at each specified interval point by a total number of data bits read on the test track at each specified interval point.

29. A disc drive as defined in claim 28, wherein the determining means further comprises:
   means for extrapolating the bit error rate values to create a decay graph representative of bit error rate change for the recordable media over the predetermined time period, wherein the decay graph links the predetermined time to an estimated bit error rate for recordable media.

30. A disc drive as defined in claim 29, wherein the determining means further comprises:
   means for computing non-decay based bit error rate values for the recordable media at each specified interval point, the non-decay based bit error rate values being representative of bit error rate affected by non-decay phenomena, wherein the non-decay based bit error rate values normalize the bit error rate values for the recordable media at each specified interval point such that the decay graph represents bit error rate change for the disc media affected by decay phenomena.

31. A computer program product tangibly embodied in an information carrier, the computer program product containing instructions that, when executed, cause a processor to perform operations to estimate a bit error rate for storage media in a data storage device at a future predetermined time, the operations comprising:
   write data to the storage media during a predetermined time period;
   read the stored data at a plurality of predetermined times during the predetermined time period;
   calculate a bit error rate for the storage media at each of the predetermined times during the predetermined time period; and
   extrapolate from the calculated bit error rates to estimate what the bit error rate for the media will be at the future predetermined time.

32. A method for estimating a bit error rate for storage media in a data storage device at a future predetermined time, the method comprising:
   writing data to the storage media during a predetermined time period;
   reading the stored data at a plurality of predetermined times during the predetermined time period;
   calculating a bit error rate for the storage media at each of the predetermined times during the predetermined time period; and
   extrapolating from the calculated bit error rates to estimate what the bit error rate for the media will be at the future predetermined time.

* * * * *